(12) United States Patent
Umeda (10) Patent No.: US 8,602,858 B2
(45) Date of Patent: Dec. 10, 2013

(54) GAME DEVICE, COMPUTER PROGRAM THEREFOR, AND RECORDING MEDIUM THEREFOR

(75) Inventor: Takashi Umeda, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 78 days.

(21) Appl. No.: 13/003,198

(22) PCT Filed: Jul. 6, 2009

(86) PCT No.: PCT/JP2009/062279
§ 371 (c)(1),
(2), (4) Date: Jan. 7, 2011

(87) PCT Pub. No.: WO2010/004953
PCT Pub. Date: Jan. 14, 2010

(65) Prior Publication Data
US 2011/0159938 A1    Jun. 30, 2011

(30) Foreign Application Priority Data
Jul. 8, 2008    (JP) .................................. 2008-178503

(51) Int. Cl.
*A63F 13/00*    (2006.01)

(52) U.S. Cl.
USPC ............................................................. 463/7

(58) Field of Classification Search
USPC .................................. 463/7; 84/609; 434/520
See application file for complete search history.

(56) References Cited

U.S. PATENT DOCUMENTS

| | | | | |
|---|---|---|---|---|
| 6,227,968 | B1* | 5/2001 | Suzuki et al. | 463/7 |
| 6,410,835 | B2* | 6/2002 | Suzuki et al. | 84/464 R |
| 2001/0004861 | A1* | 6/2001 | Suzuki et al. | 84/609 |

FOREIGN PATENT DOCUMENTS

| | | |
|---|---|---|
| JP | 2001-161878 A | 6/2001 |
| JP | 2002-166046 A | 6/2002 |
| JP | 3470091 B | 9/2003 |
| JP | 2004-174275 A | 6/2004 |
| JP | 3634273 B2 | 1/2005 |

OTHER PUBLICATIONS

International Search Report dated Sep. 8, 2009.

* cited by examiner

*Primary Examiner* — David L Lewis
*Assistant Examiner* — Eric M Thomas
(74) *Attorney, Agent, or Firm* — Sughrue Mion, PLLC (57) ABSTRACT

A game device causes a display device to display an image in which plural marks correlated with step panels to be stepped on by a player move to reach a base line, and the game device, when a step panel is stepped on, classifies the degree of accuracy of this operation as one of plural classes based on a time at which a mark corresponding to this step panel reaches the base line, a time at which this step panel was stepped on, and plural thresholds. The game device counts the number of accurate operations, to cause the display device to display the number in a color corresponding to the lowest accurate operation class corresponding to the counted accurate operations.

7 Claims, 7 Drawing Sheets

GAME DEVICE, COMPUTER PROGRAM THEREFOR, AND RECORDING MEDIUM THEREFOR

This application is a 35 U.S.C. §371 filing of International Patent Application PCT/JP2009/062279 filed on Jul. 6, 2009, which claims the priority to Japanese Patent Application No. 2008-178503, filed Jul. 8, 2008, both of which are incorporated herein in their entirety.

TECHNICAL FIELD

The present invention relates to a game device, to a computer program therefor, and to a recording medium therefor.

BACKGROUND ART

There is a type of computer game in which a player moves so as to match a standard movement sequence preinstalled in a computer, in which the computer determines whether each movement of the player matches respective standard movements, and in which the player is evaluated more highly the better the degree of agreement, with the standard movement sequence, of the player's movements (i.e., the accuracy of movements) in a play period. An example of such a computer game is a dance game described in Patent Document 1.

In addition, there is a game device for a dance game, in which game device an image is displayed on a display device, the image showing plural marks correlated one-to-many with plural operation devices, with the plural marks moving to reach a predetermined position, and, in which, when an operation device corresponding to a mark that has reached the predetermined position is operated, the degree of accuracy of the operation of this time is classified as one of plural classes based on a time at which this mark reaches the predetermined position, a time at which the operation device was operated, and plural thresholds. In this game device, the difference between the standard time and the time at which the operation device was operated is compared with plural thresholds, to classify the degree of accuracy of the operation as one of the classes and to display, on the display device, a character indicating the class in a color correlated with the class, thereby indicating an evaluation message having a character and a color indicating the class of the accuracy of operation. Furthermore, this game device causes the display device to display the number of continuing operations that have the degree of agreement (the degree of accuracy) that falls in the specific class or above (consecutive accurate operation number). The consecutive accurate operation number is reset when an operation having the degree of agreement below the specific class (i.e., a low degree of accuracy) is performed.

For example, in a dance game, evaluation classes are determined as Marvelous, Perfect, Great, Good, Almost, and Boo, when listed in descending order, and in the game device, every time an operation device corresponding to a mark having reached the predetermined position is operated, an evaluation message indicating one of the classes (for example, "Boo") is displayed, and, in certain instances, the number of continuing operations falling in "Great" or above (consecutive accurate operation number) is displayed. Thus, the number of continuing operations having a class of a high degree of accuracy is displayed. A player or onlookers (people in the gallery) around the player can know whether the play is good or bad by looking at not only scores but also these displays.
Patent Document 1 Japanese Patent Application Laid-Open Publication No. 2001-161878

When a player's skill is higher than a certain degree, there will be a lower probability of the consecutive accurate operation number being reset. Therefore, in view of knowing whether the play is good or bad in detail, it is more important for a player with a skill higher than a certain degree to know, not the consecutive accurate operation number itself, but an operation, in what class, at the degree of accuracy, is included in operations for the consecutive accurate operation number. However, in a case of using the above game device, for a player or an onlooker to determine the skill of the player in detail, one must remember an evaluation message displayed for each operation so that one does not miss it, which is not easy. Furthermore, in a case in which, for example, during a play by a player, "20" is displayed as the consecutive accurate operation number, and if a passing onlooker looks at this display, this onlooker cannot determine whether the consecutive accurate operations include an operation under Great, which is the third highest accuracy class, or whether operations with a higher degree of accuracy are continuing.

DISCLOSURE OF INVENTION

The present invention has been made in view of the situations described above, and has, as an object, to display, in an easy-to-understand manner, whether a play is good or bad sufficiently in detail, in a computer game in which it is determined whether the each of the player's movement agrees with a standard movement sequence prepared in advance.

Description will first be given of terms.

A "computer game" is a game in which a play is carried out using a computer. A computer used for the implementation of a computer game is called a "game device" of the computer game. A game device may be capable of implementing only a single computer game, or may be capable of implementing plural computer games.

A place at which a game device is installed is called a "game venue (game place)". Examples of a game place include a facility at which visitors use the installed game terminal by paying a fee (for example, a game arcade) and a residential dwelling at which a game terminal is installed. In the former, a visitor in most cases will be a user of a game terminal and will be a player of a computer game; and in the latter, a resident in most cases will be a user of a game terminal and will be a player of a computer game. In the former, a game terminal that has a function of collecting fees from its user (a type of commercial-use game machine) is installed in most cases; and in the latter, a game terminal that does not have a function of collecting fees from its user (a type of household use game machine) is installed in most cases.

A "computer" is, from among apparatuses for processing data, one that has a memory for storing data and a processor for executing a computer program loaded in the memory. "Data" represents information in a form that is recognizable by a machine such as a computer. Examples of data include data electrically representing information, data magnetically representing information, and data optically representing information. The "information" is a generic term for an object of a process that can be represented by data. The "memory" is a device that readably stores data written therein. Examples of the memory include a semiconductor memory, a magnetic memory, and an optical memory. A "computer program" is, from among collections (for example, a code string) of data (code) representing instructions, one that indicates the procedure of a process. Examples of a computer program include a program for causing a computer to carry out a procedure of a computer game when the program is run by the computer. A "processor" is a device which is equipped with an instruction set and which executes a computer program by performing a process of executing instructions represented by data in the computer program in accordance with a procedure indicated by the computer program, the computer program being a collection of data representing instructions. Examples of a processor include a single CPU (Central Processing Unit) and a collection of plural CPUs.

Examples of a computer include a computer provided with an interface with the outside. Examples of an interface with the outside include: an input unit for inputting information or data from the outside and an output unit for outputting information or data to the outside. "To input" information is an activity of generating data representing the outside information by detection or measurement. Examples of the input unit include a sensor, a button, and a keyboard. "To output" information is to represent information represented by data in such a way that information can be perceived by a human. Examples of ways in which information can be perceived by a human include by light, by sound, and by vibration. Examples of outputting information by light include the displaying of images and the blinking of lights. Examples of outputting information by sound include emitting sounds by a speaker and driving a sound structure by a solenoid (for example, ringing a bell). Examples of outputting information by vibration include oscillation by an oscillator.

Next, description will be given of the present invention.

The present invention provides a game device having at least one operation device operated by a player; an operation instructor for instructing the player to perform consecutive individual standard operations; an evaluator for classifying the degree of accuracy of each operation by the player as one of plural classes based on a time difference between a time at which each of the standard operations should be performed and a time at which the operation device was operated, the plural classes including plural accurate operation classes and at least one inaccurate operation class; a consecutive accurate operation number counter for counting the consecutive number of accurate operations, by the player, classified by the evaluator as belonging to one of the accurate operation classes; a lowest class accurate operation identifier for identifying, from among accurate operation classes corresponding to plural accurate operations counted by the consecutive accurate operation number counter, the lowest accurate operation class by the player; and an accurate operation number display instructor for causing a display device to display the number counted by the consecutive accurate operation number counter in a color corresponding to the lowest accurate operation class identified by the lowest class accurate operation identifier.

According to this game device, in a computer game in which it is determined whether the player's individual movements agree with a standard movement sequence prepared in advance, the number of continuing accurate operations of a particular class or above is displayed in a color corresponding to the lowest accurate operation class from among the counted accurate operations. Therefore, it is possible to display whether a play is good or bad with sufficient detail in an easy-to-understand manner. Therefore, a person who is familiar with correspondence relationships between the classes for the degree of accuracy of operations and colors displayed on the display device can know not only the consecutive accurate operation number displayed on the display device, but also the lowest accuracy class from among continuing accurate operations, by color.

The above game device may further have a storage device having stored therein correspondence relationships between classes for the degree of accuracy to be classified by the evaluator and colors to be displayed on the display device; and an evaluation message display instructor for causing the display device to display an evaluation message indicating a class classified by the evaluator every time the evaluator classifies the degree of accuracy for each operation as one of the plural classes, and the evaluation message display instructor may cause the display device to display the evaluation message in a color corresponding to the class classified by the evaluator in accordance with the correspondence relationships stored in the storage device, and the accurate operation number display instructor may cause the display device to display the number counted by the consecutive accurate operation number counter in a color corresponding to the lowest accurate operation class in accordance with the correspondence relationships stored in the storage device.

According to this embodiment, an evaluation message corresponding to a class for the degree of accuracy of an operation evaluated by the evaluator is displayed in a color corresponding to this class in accordance with correspondence relationships, and the consecutive accurate operation number is displayed in a color corresponding to the lowest accuracy operation class from among accurate operations for which the consecutive accurate operation number is counted, in accordance with the same correspondence relationships. Therefore, it is possible to easily identify the accurate operation class of the consecutive accurate operation number based on the colors of both the evaluation message and the consecutive accurate operation number. Therefore, in a case in which the color of the consecutive accurate operation number is the same as the color of the evaluation message, the lowest accurate operation class is the same as the class indicated by the displayed evaluation message. In a case in which the color of the consecutive accurate operation number is different from the color of the evaluation message, the lowest accurate operation class is different from a class indicated by the displayed evaluation message. Therefore, even a person who is not familiar with the correspondence relationships between the classes for the degree of accuracy of operation and the colors displayed on the display device can infer the lowest accuracy class of the continuing accurate operations.

Furthermore, the present invention provides a computer program, or a computer-readable recording medium having stored thereon the computer program, the program for causing a computer having at least one operation device operated by a player to function as: an operation instructor for instructing the player to perform consecutive individual standard operations; an evaluator for classifying the degree of accuracy of each operation by the player as one of plural classes based on a time difference between a time at which each of the standard operations should be performed and a time at which the operation device was operated, the plural classes including plural accurate operation classes and at least one inaccurate operation class; a consecutive accurate operation number counter for counting the consecutive number of accurate operations, by the player, classified by the evaluator as belonging to one of the accurate operation classes; a lowest class accurate operation identifier for identifying, from among accurate operation classes corresponding to plural accurate operations counted by the consecutive accurate operation number counter, the lowest accurate operation class by the player; and an accurate operation number display instructor for causing a display device to display the number counted by the consecutive accurate operation number counter in a color corresponding to the lowest accurate operation class identified by the lowest class accurate operation identifier.

According to this computer program, in a computer game in which it is determined whether player's individual movements agree with a standard movement sequence prepared in advance, the number of continuing accurate operations of a particular class or above is displayed in a color corresponding to the lowest accurate operation class from among the counted accurate operations. Therefore, the computer can display whether a play is good or bad in sufficient detail in an easy-to-understand manner.

The present invention is understood as a transmission media (for example, network) for transmitting the computer program. That is, the present invention is understood as a medium (data carrier) for recording or transmitting the computer program in such a way that can be read by a computer. Also, the present invention is understood as a computer program element which is a part or the whole of the computer program. Furthermore, the present invention is understood as a computer program product having a medium for storing data that serves as the computer program when loaded in a computer.

Effects of the Invention

According to the present invention, in a computer game in which it is determined whether the player's individual movements agree with a standard movement sequence prepared in advance, it is possible to display whether a play is good or bad in sufficient detail in an easy-to-understand manner.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within its scope. An embodiment of the present invention relates to a specific dance game. The specific dance game is a type of a computer game in which a player is evaluated more highly the greater the agreement of the player's steps with the standard dance prepared in advance. The number of standard dances prepared in advance is two. However, this is merely to facilitate understanding of the description. Alternatively, one standard dance may be freely selected from a greater number of standard dances.

Configuration

Figure 1:
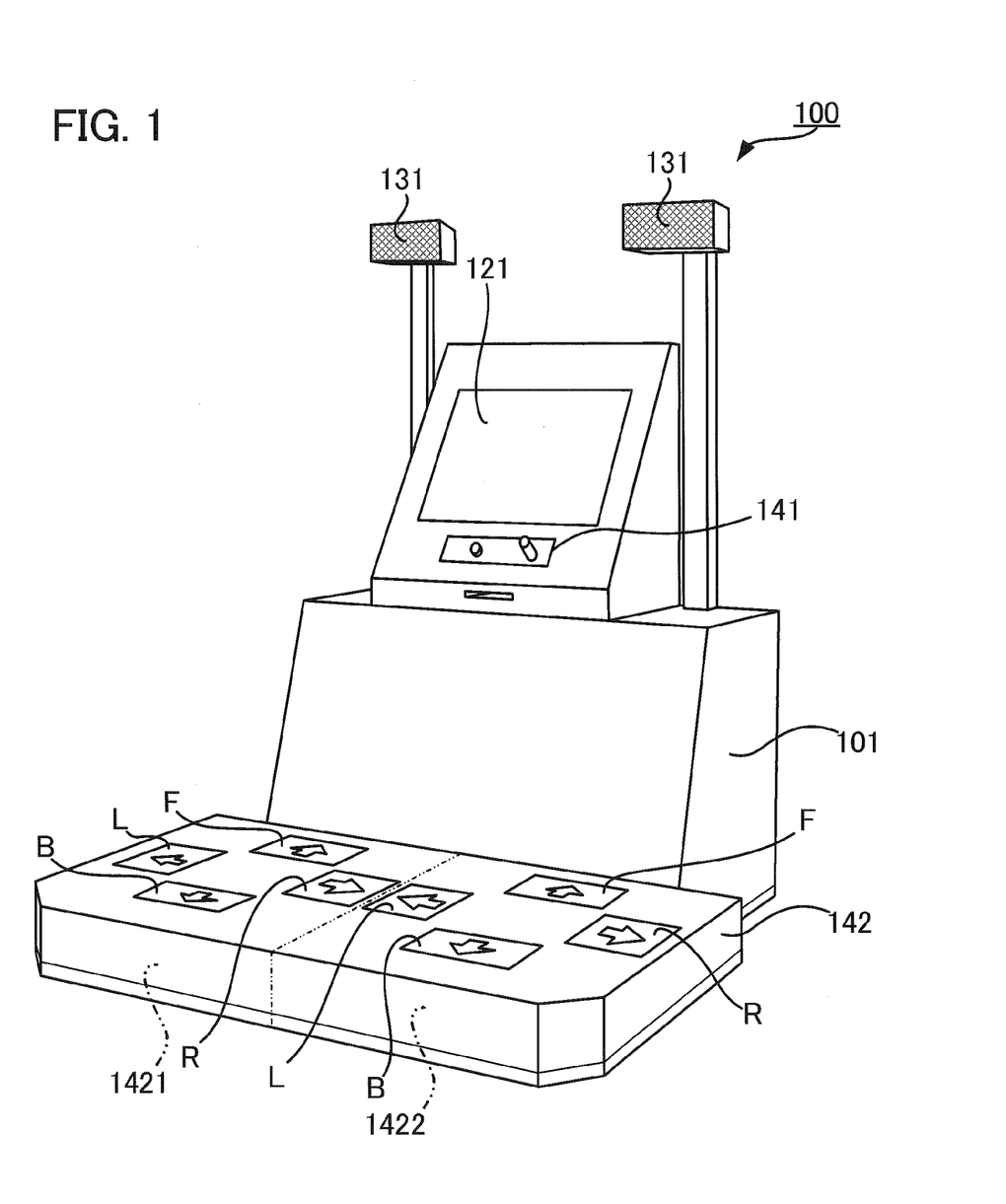
FIG. 1 is a perspective view showing an external view of a game device according to an embodiment of the present invention.

FIG. 1 is a perspective view showing an external view of a game device 100 according to an embodiment of the present invention. Game device 100 is a game device (commercial-use game machine) for a specific dance game, and is installed at a game venue. Game device 100 has a main body 101 and a tabular lower operation unit 142. The lower surface of lower operation unit 142 is in contact with the floor surface of the game venue, and a player can dance on lower operation unit 142.

Lower operation unit 142 has a tabular, first stage 1421 and a tabular, second stage 1422. First stage 1421 and second stage 1422 do not overlap each other, and the upper surfaces thereof are flush and form the upper surface of lower operation unit 142.

Play modes of a specific dance game include a single stage mode and a double stage mode. In the single stage mode, one player dances on each stage. The single stage mode includes a 1-player mode and a 2-player mode. In the 1-player mode, a player dances on first stage 1421, but no one dances on second stage 1422. In the 2-player mode, a player dances on first stage 1421, while another player dances on second stage 1422. Each player performs dances, with the center, approximately, of the using stage as a home position.

In the double stage mode, one player dances using first stage 1421 and second stage 1422. Therefore, one player performs dances, with the boundary, approximately, between first stage 1421 and second stage 1422 as a home position.

First stage 1421 and second stage 1422 each has a front step panel F that is stepped on when a player moves a leg of the player forward from the home position, a back step panel B that is stepped on when the player moves the leg backward, a left step panel L that is stepped on when the player moves the leg leftward, and a right step panel R that is stepped on when the player moves the leg rightward. In each of first stage 1421 and second stage 1422, exposed on the upper surface thereof are front step panel F, back step panel B, left step panel L and right step panel R.

Main body 101 is connected to an edge of lower operation unit 142. Main body 101 is provided with a screen 121 on which color images are displayed, a pair of speakers 131 for outputting sounds, the speakers having identical specifications, and an upper operation unit 141 having an operation device (for example, a lever or buttons) operated by a player. Upper operation unit 141 generates data corresponding to an operation of the operation device of the upper operation unit, to supply the data to a processor of game device 100, and serves as an information input unit for inputting information from the outside.

Figure 2:
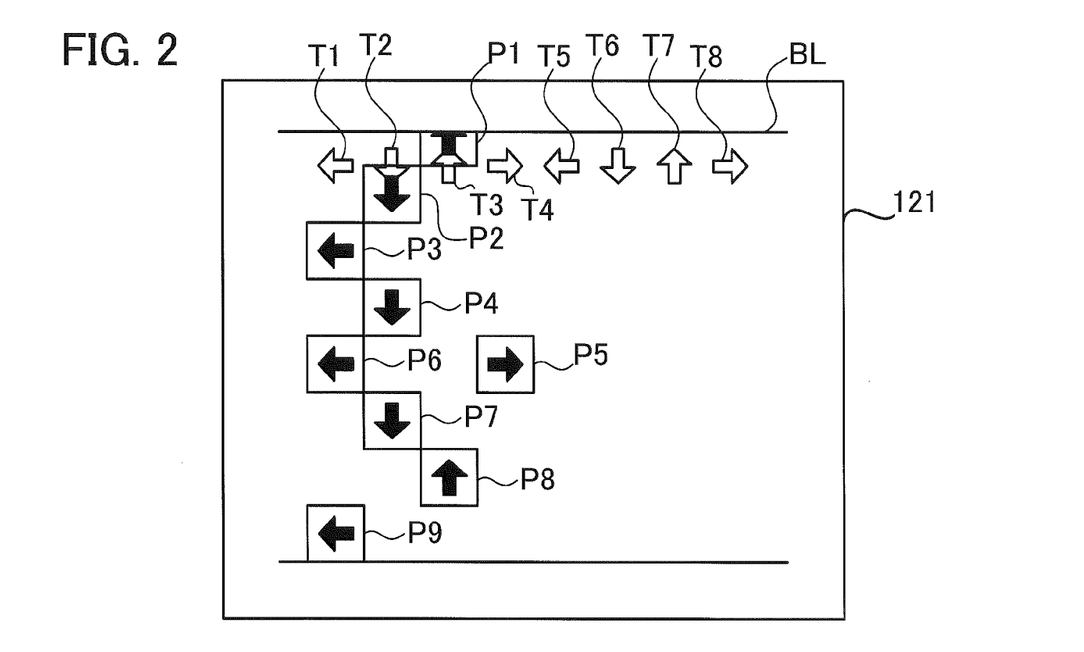
FIG. 2 is a diagram showing an example of an image displayed on an image display device of the game device.
Figure 3:
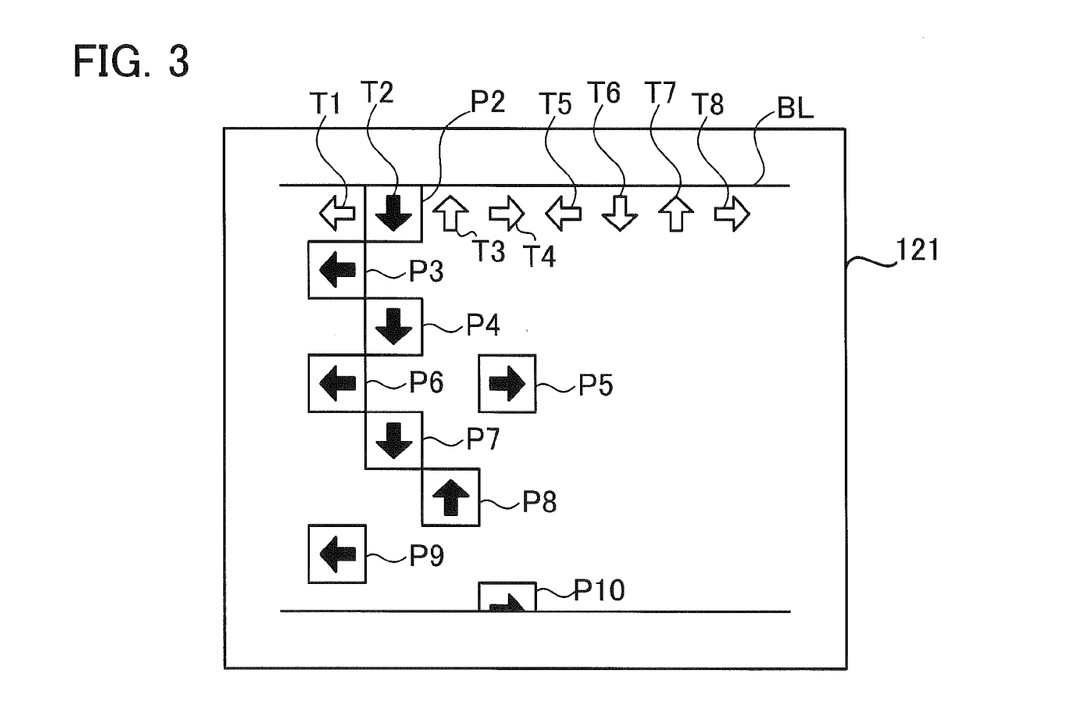
FIG. 3 is a diagram showing an example of an image displayed on the image display device of the game device.

FIGS. 2 and 3 are diagrams each showing an example of an image displayed on screen 121. In the specific dance game, the image of FIG. 3 is displayed on screen 121 immediately after the image of FIG. 2 is displayed. As is clear from these figures, in the specific dance game, displayed on screen 121 are step panel instruction marks P1, P2, . . . moving from the lower to the upper portion of the screen, and displayed on the upper portion thereof are step time instruction marks T1 to T8 that are fixedly provided next to one another in the right-and-left direction.

Step time instruction marks T1, T2, T3, and T4 are marks for instructing a time to step on left step panel L, back step panel B, front step panel F, and right step panel R, respectively, of first stage 1421; and step time instruction marks T5, T6, T7, and T8 are marks for instructing a time to step on left step panel L, back step panel B, front step panel F, and right step panel R, respectively, of second stage 1422. Each of step panel instruction marks P1, P2, . . . instructs one of front step panel F, back step panel B, left step panel L, or right step panel R of first stage 1421 as a step panel to step on.

The images shown in FIGS. 2 and 3 are images of where the play mode is the 1-player mode of the single stage mode. In the case of the 2-player mode or the double stage mode, step panel instruction marks for instructing each step panel of second stage 1422 are also displayed. In the upper portion of screen 121, the front end of each step panel instruction mark reaches a base line BL, and the step panel instruction mark completely overlaps a step time instruction mark for the step panel at a time when a step panel instructed by the mark is to be stepped on.

In the specific dance game, a player stands on lower operation unit 142, and while looking at an image displayed on screen 121, steps on a step panel as instructed by the image at a time instructed by the image. Thus, in the play of a dance game, a player faces main body 101. Therefore, in each of first stage 1421 and second stage 1422, front step panel F is provided on the main body 101 side, back step panel B is on the other side of main body 101, left step panel L is on the left hand of main body 101, and right step panel R is on the right hand of main body 101.

Figure 4:
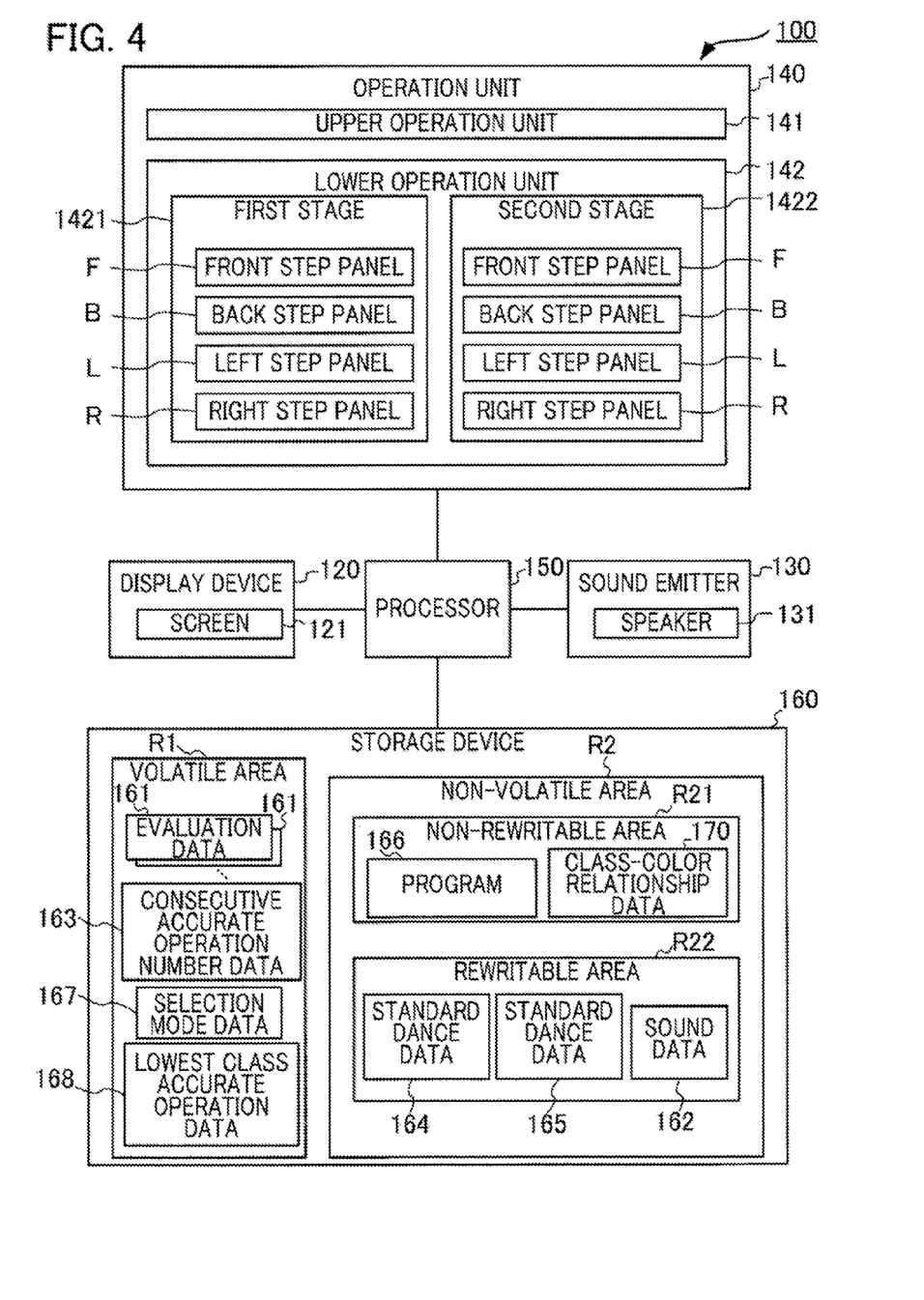
FIG. 4 is a block diagram showing an electrical configuration of the game device.

FIG. 4 is a block diagram showing an electrical configuration of game device 100. Game device 100 has a processor 150 for performing various data processes, an operation unit 140 that is operated by a player and for supplying operation data corresponding to the operation to processor 150, a display device 120 for displaying, on screen 121, an image using image data supplied from processor 150, a sound emitter 130 for outputting, from speakers 131, sound data from processor 150, and a storage device 160 for storing various types of data. Display device 120 is, for example, a monitor, but it may also be a video projector. In the case of a video projector, a screen on which an image is projected corresponds to screen 121.

Operation unit 140 has an upper operation unit 141 and a lower operation unit 142. Upper operation unit 141 supplies processor 150 with operation data corresponding to the content of an operation of the operation device. Therefore, upper operation unit 141 serves as an information input unit for inputting information from the outside. Front step panel F of first stage 1421 for lower operation unit 142 is provided with a switch (for example, a cable switch) for which ON or OFF can be switched depending on a load, and when the switch is stepped on by person, and supplies processor 150 with operation data indicating an address of the front step panel F itself. This is the same for other step panels for first stage 1421, and also for front step panel F, back step panel B, left step panel L, and right step panel R in second stage 1422. Thus, first stage 1421 and second stage 1422, respectively, serve as an operation unit for supplying processor 150 with operation data corresponding to the content of an operation of the operation device. Naturally, lower operation unit 142 serves as an operation unit for supplying processor 150 with operation data corresponding to the content of an operation by a person to the operation device.

A memory area of storage device 160 is divided into a volatile area R1 for which the power is required for retaining the memory and a non-volatile area R2 which is not. Non-volatile area R2 is divided into a non-rewritable area R21 in which the memory content is non-rewritable and a rewritable area R22 in which the memory content is rewritable. Volatile area R1 is made, for example, by a RAM (Random Access Memory), and non-rewritable area R21, for example, by a ROM (Read Only Memory) and rewritable area R22, for example, by a hard disk.

There is stored, in non-rewritable area R21, a computer program 166 executed by processor 150. Computer program 166 is a computer program for causing processor 150 of game device 100 to perform the following game process. There are stored in rewritable area R22 standard dance data 164 and 165 indicating the content of a standard dance prepared in advance and sound data 162 for replaying the sound corresponding to a standard dance. Standard dance data 164 shows the content of a standard dance in the single stage mode, and standard dance data 165 shows a standard dance in the double stage mode. Sound data 162 may be data generated by sampling or other data.

Figure 5:
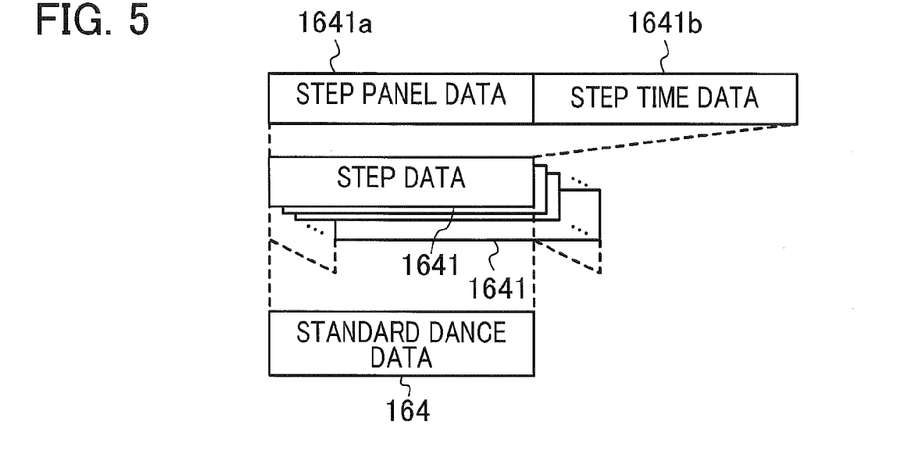
FIG. 5 is a diagram schematically showing a configuration of standard dance data used in the game device.

FIG. 5 is a diagram schematically showing a configuration of standard dance data 164. Standard dance data 164 shows the contents of a series of steps (step sequence) using a stage, and has plural pieces of step data 1641. Each step data 1641 is data showing details of one step, and has step panel data 1641*a* showing an address of a step panel to be stepped on for the step and step time data 1641*b* indicating a time for stepping the step.

Standard dance data 164 is for the single stage mode, and is used for each of two plays progressing in parallel in the 2-player mode. Therefore, the address indicated by the step panel data 1641*a* is a relative address indicating one of the four step panels in one stage used by a player, and the total number of the addresses is 4. A time indicated by time data 1641*b* is, for example, elapsed time from the start of the sound replay using sound data 162. The address indicated by step panel data included in standard dance data 165 is an absolute address indicating one of the eight panels of lower operation unit 142, and the total number of addresses is eight.

Selection mode data 167 is stored in volatile area R1 of FIG. 4. Selection mode data 167 is data showing a mode selected by a player, and indicates a combination of the single stage mode and the 1-player mode, a combination of the single stage mode and the 2-player mode, or the double stage mode.

In volatile area R1, plural pieces of evaluation data 161 are sequentially written for each play (player). Therefore, in a case in which the selected mode is the 1-player mode or the double stage mode, pieces of evaluation data 161 for one sequence are sequentially written in volatile area R1. In a case in which the selected mode is the 2-player mode, pieces of evaluation data 161 for two sequences in parallel are sequentially written in volatile area R1. Each evaluation data 161 indicates evaluation indicating the accuracy of a step (operation) by a player according to one of 6 classes determined in advance. The 6 classes when listed in descending order are Marvelous, Perfect, Great, Good, Almost, and Boo. In the present description, Marvelous, Perfect, and Great classes will be called accurate operation classes, and Good, Almost, and Boo classes will be called inaccurate operation classes.

In non-rewritable area R21 of FIG. 4, there is stored class-color relationship data 170 describing correlations between the classes in the degree of accuracy of operations and colors displayed on screen 121 of display device 120.

Figure 6:
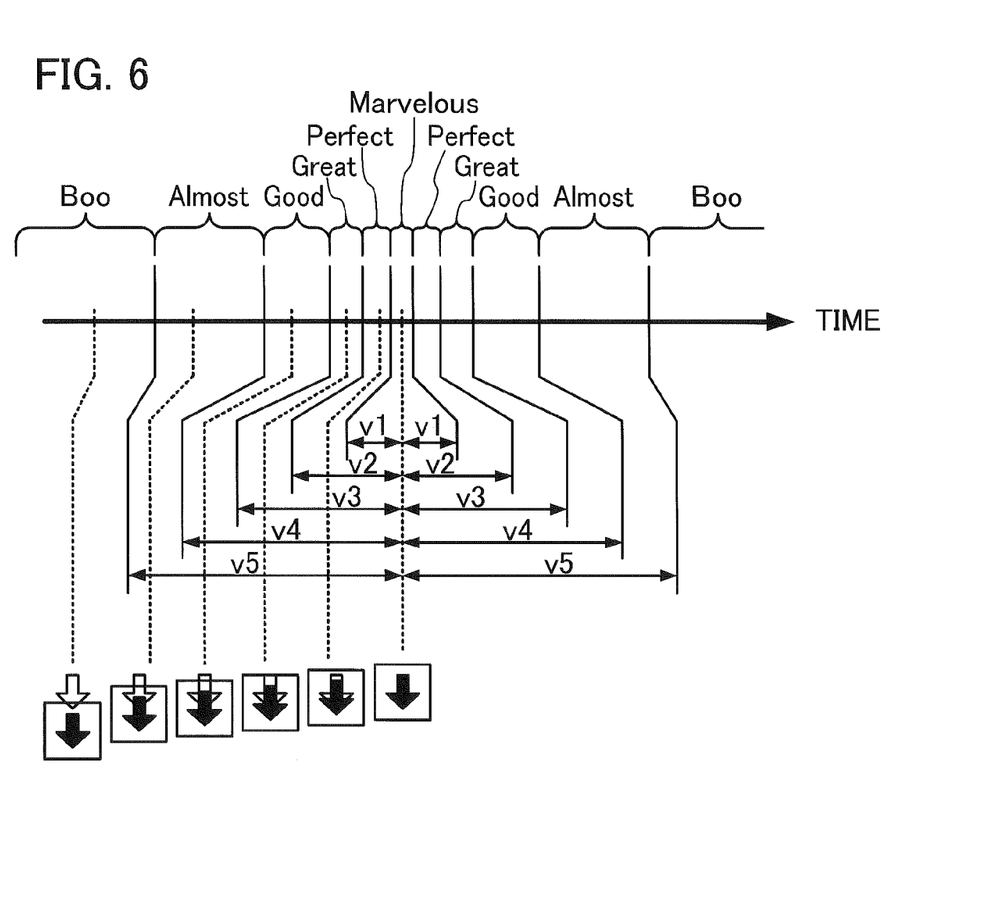
FIG. 6 is a schematic diagram for describing classes for the degree of accuracy in the present embodiment.

FIG. 6 is a schematic diagram for describing the classes for the degree of accuracy of operation according to the present embodiment. As shown in this figure, in the present embodiment, 5 positive thresholds (v1 to v5) are prescribed, with the thresholds being $v1<v2<v3<v4<v5$. Each threshold indicates the time difference from a time at which step panel instruction mark completely overlaps a step time instruction mark, and sets a boundary between two classes having different degrees of accuracy and residing next to each other. For example, v1 sets a boundary between Marvelous and Perfect; and v2 sets a boundary between Perfect and Great.

In volatile area in R1 of FIG. 4, consecutive accurate operation number data 163 indicating the consecutive accurate operation number is stored for each play (player). That is, in a case in which the selected mode is the 1-player mode or the double-stage mode, a piece of consecutive accurate operation number data 163 is stored in volatile area R1, and in the 2-player mode, two pieces of consecutive accurate operation number data 163 for two players are stored in volatile area R1. The consecutive accurate operation number is the number of operations having a degree of agreement (degree of accuracy) according to a class (accurate operation class) under Great or above continuing in a play period described later. For example, in a case in which an operation under Perfect, an operation under Good, an operation under Marvelous, or an operation under Great is performed continuously for two times without having another operation (inaccurate operation class) between them, the consecutive accurate operation number is two.

Furthermore, in volatile area R1, from among pieces of evaluation data for the consecutive accurate operation number, one that indicates the lowest accurate operation class is stored as lowest class accurate operation data 168. Each piece of evaluation data for the consecutive accurate operation number is, from among pieces of evaluation data 161 stored in volatile area R1, a piece of evaluation data for an operation under a class of Great or above, after which operation no operation under a class below Great is performed, i.e., each evaluation data piece indicating respective classes of currently continuing accurate operations. Because the lowest class accurate operation data 168 is a piece of evaluation data that indicates the lowest class accurate operation data from among the pieces of evaluation data indicating the classes of currently continuing accurate operations, a class indicated by lowest class accurate operation data 168 is Marvelous, Perfect, or Great.

Operation

Figure 7:
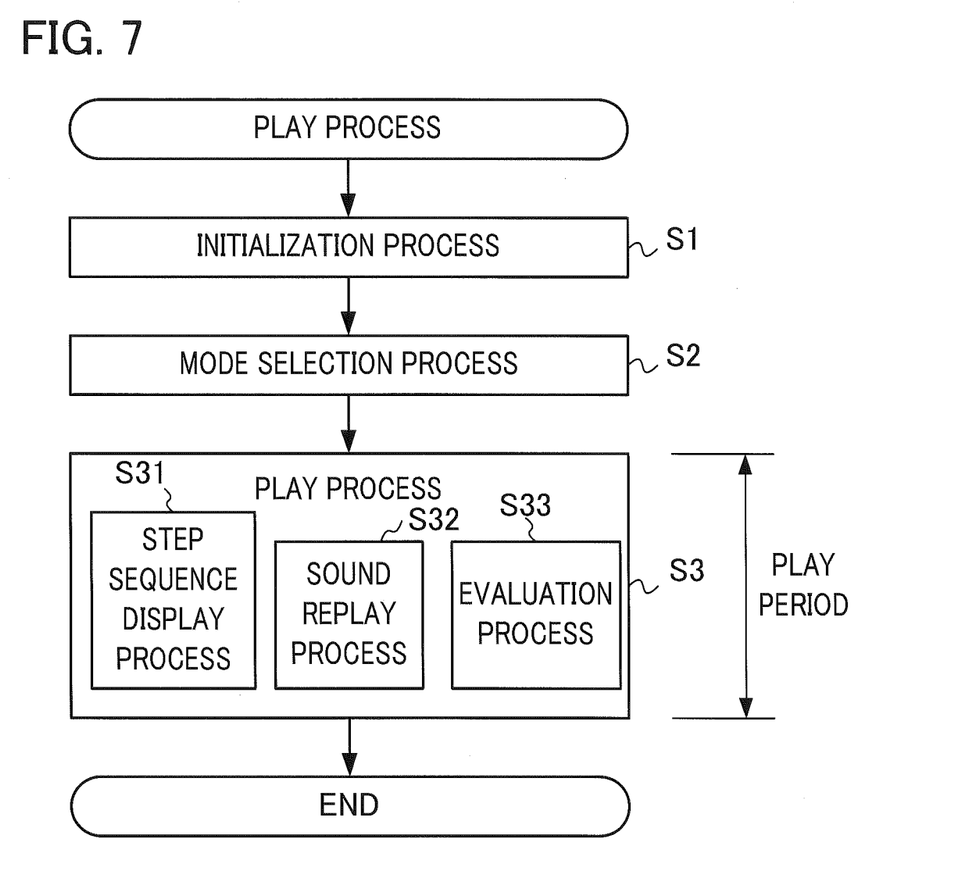
FIG. 7 is a flowchart showing a procedure of a game process performed by the game device.

FIG. 7 is a flowchart showing a procedure of a game process. In the game process, processor 150 first performs an initialization process for clearing the stored content of volatile area R1 (S1). In the initialization process, data indicating Marvelous is written into volatile area R1 as lowest class accurate operation data 168.

Processor 150 then performs a selection process for having a player select a mode (S2). In the mode selection process, processor 150 controls display device 120 to display an image for selecting a mode on screen 121, identifies a mode based on data from upper operation unit 141, and writes data indicating the identified mode as selection mode data 167 into volatile area R1. Here, as an example, we assume that a combination of the single stage mode and the 1-player mode is selected, and that data indicating this combination is written into volatile area R1 as selection mode data 167. Also, a piece of initial value data indicating 0 is written in volatile area R1 as consecutive accurate operation number data 163.

Subsequently, processor 150 performs a play process (S3). A period from the start to the end of the play process is a play period. In the play process, processor 150 performs a step sequence display process (S31), a sound replay process (S32), and an evaluation process (S33) in parallel. The play process ends when the sound replay process and the step sequence display process end.

In the step sequence display process, processor 150 uses standard dance data (standard dance data 164) corresponding to the mode (single stage mode) indicated by selection mode data 167, and causes display device 120 to display the step sequence of a standard dance in a form of display corresponding to the mode (1-player mode) indicated by selection mode data 167. As a result, an image instructing each step of the standard dance, specifically, a moving image in which, as shown in FIGS. 2 and 3, plural step panel instruction marks correlated with 4 step panels move to reach the base line BL are displayed on screen 121. Thus, processor 150 serves as an operation instructor for instructing a player of consecutive individual standard operations.

In the sound replay process, processor 150 uses sound data 162 to replay sounds. Specifically, processor 150 supplies sound data 162 to sound emitter 130. Thus, sounds corresponding to sound data 162 are output from speakers 131.

Figure 8:
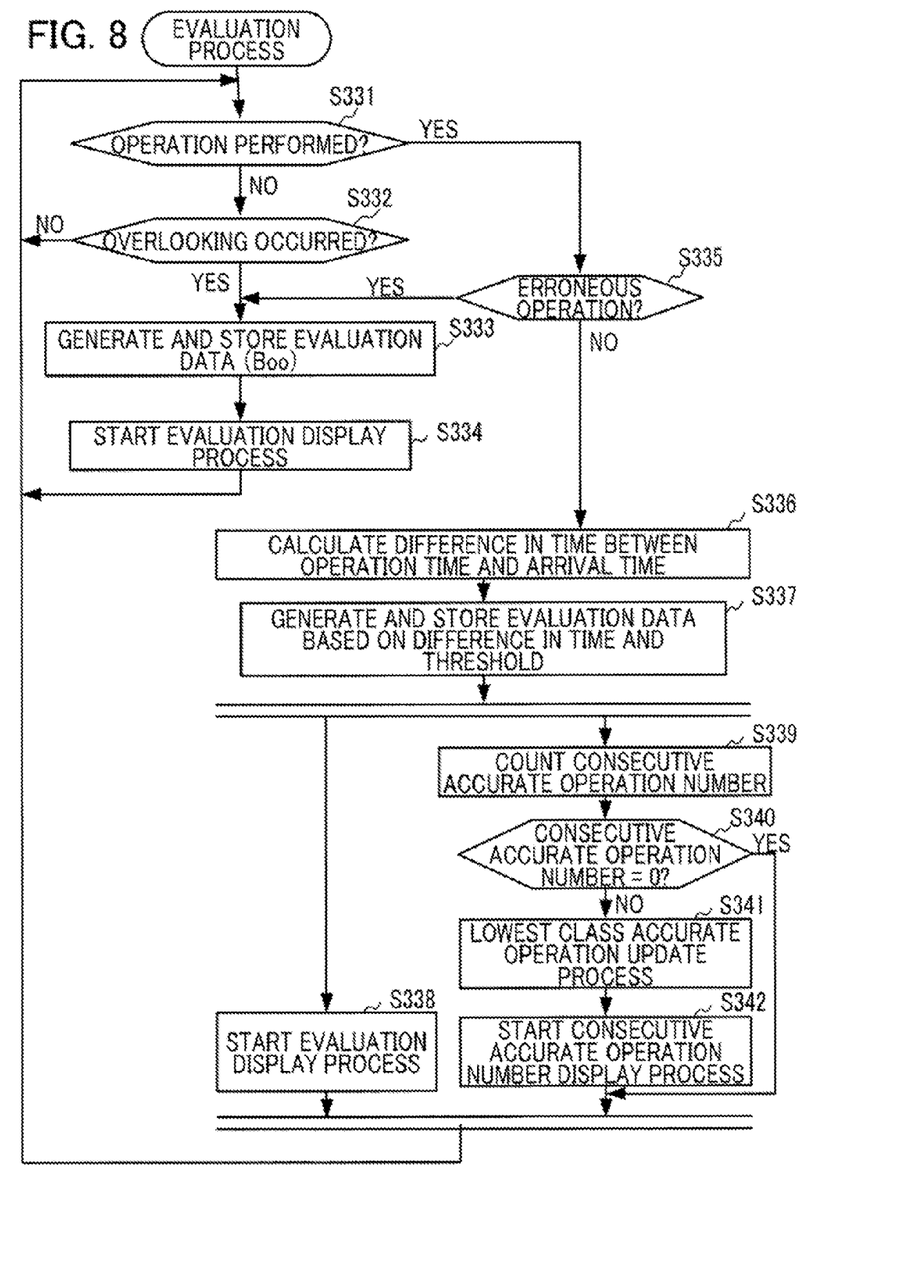
FIG. 8 is a flowchart showing a procedure of an evaluation process included in the game process.

FIG. 8 is a flowchart showing a procedure of the evaluation process. The evaluation process is a process for evaluating the degree of accuracy of the player's operations. In the evaluation process, processor 150 first determines whether an operation was performed by using operation data supplied from lower operation unit 142 (S331). Specifically, processor 150 determines whether front step panel F, back step panel B, left step panel L, or right step panel R of first stage 1421 was stepped on.

In a case in which a result of this determination is NO, processor 150 determines whether an operation was not performed during a time in which an operation should be performed, i.e., whether overlooking has newly taken place (S332). In this determination, processor 150 determines whether a step panel corresponding to a step panel instruction mark is stepped on during a period of v5 before and after a time at which the step panel instruction mark reaches base line BL. This determination is performed based on standard dance data 164, evaluation data 161 stored in volatile area R1, and threshold v5.

In a case in which a result of this determination is NO, the process returns to Step S331. That is, processor 150 repeats the process of Steps S331 and S332 until an operation is performed or overlooking has newly taken place. On the other hand, in a case in which a result of the determination in Step S332 changes to YES as overlooking has newly taken place, processor 150 generates data showing Boo, writes this data into volatile area R1 as evaluation data 161 for this step panel instruction mark (S333), and starts an evaluation display process for displaying evaluation on the player's operation (S334).

Figure 9:
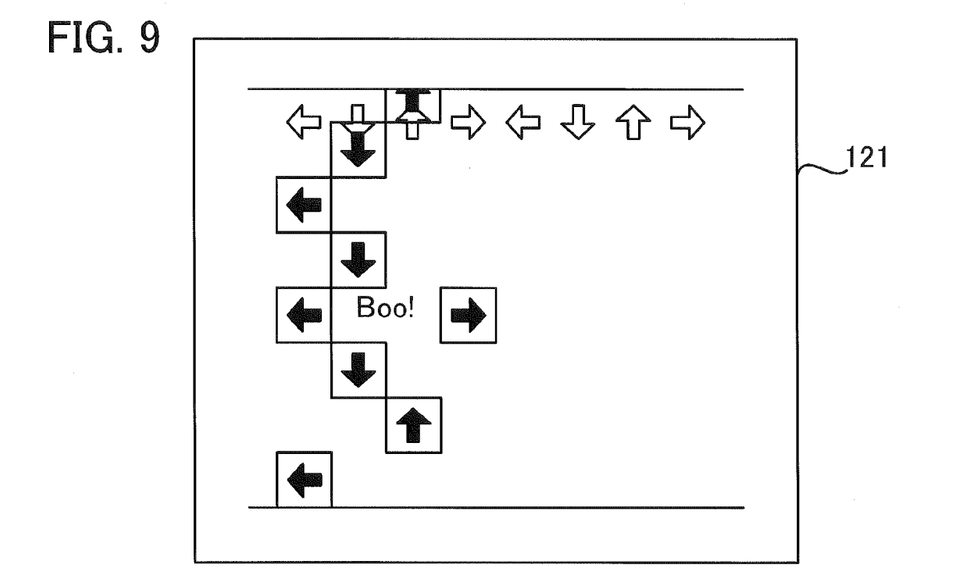
FIG. 9 is a diagram showing an example of an image displayed on the image display device of the game device.

In this evaluation display process, processor 150, as shown in FIG. 9, causes display device 120 to display, for a predetermined time period, evaluation message "Boo!" showing a class (Boo) indicated by evaluation data 161 generated in Step S333, in a color corresponding to this class in accordance with the correspondence relationships described in class-color relationship data 170. In the present embodiment, white for Marvelous, yellow for Perfect, green for Great, blue for Good, red for Almost, ash for Boo are correlated, and these correspondence relationships are described in class-color relationship data 170. When the evaluation display process starts, the process returns to Step S331.

On the other hand, in a case in which a result of the determination in Step S331 is YES, processor 150 determines whether a step panel instruction mark corresponding to a panel that was stepped on is not the step panel instruction mark that has reached base line BL, specifically, whether the step panel instruction mark corresponding to the panel that was stepped on had not reached base line BL during a period from the threshold v5 before and the threshold v5 after a time at which the panel was stepped on, i.e., whether the operation was an erroneous operation (S335). In a case in which a result of the determination is YES, the process advances to Step S333.

On the other hand, in a case in which a result of the determination in Step S335 is NO, processor 150 calculates the difference in time between an operation time (a time at which the operation was performed) and an arrival time (a time at which a step panel instruction mark corresponding to the stepped panel reaches base line BL) (S331). In this calculation, the operation time is identified based on the operation data, and the arrival time is identified based on standard dance data 164, and the difference therebetween is identified as the time difference.

Processor 150 then compares the time difference with the thresholds v1 to v5 to identify a corresponding class, and writes data indicating the identified class as evaluation data 161 into volatile area R1 (S337). For example, in a case in which v2<time difference<v3, as is clear from FIG. 6, Perfect is identified as a corresponding class, and evaluation data 161 indicating Perfect is additionally stored in volatile area R1. Thus, processor 150 serves as an evaluator for classifying the degree of accuracy of each operation by a player as one of plural classes based on the difference between a time at which a standard operation should be performed and a time at which the operation device was performed.

Figure 10:
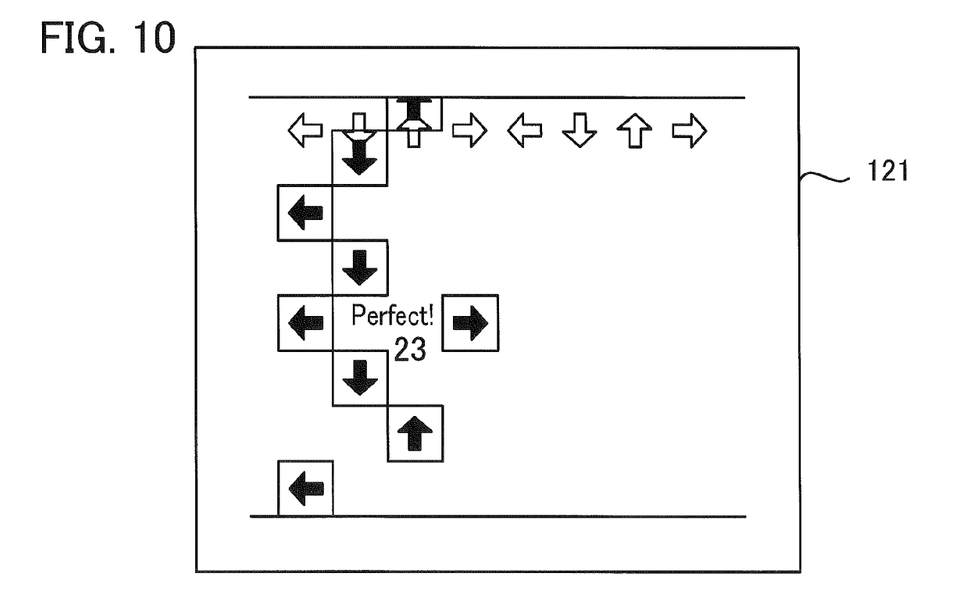
FIG. 10 is a diagram showing an example of an image displayed on the image display device of the game device.

Processor 150 then starts an evaluation display process (S338). In this evaluation display process, processor 150, as shown in FIG. 10, causes display device 120 to display, for a predetermined time, an evaluation message (for example, "Perfect!") showing a class (for example, Perfect) indicated by evaluation data 161 generated in Step S337, in a color corresponding to this class in accordance with correspondence relationships described in class-color relationship data 170. Thus, processor 150 serves as an evaluation message display instructor for, every time it classifies the degree of accuracy of each operation as one of the plural classes, causing display device 120 to display an evaluation message showing the classified class. Furthermore, processor 150 performs the process from Step S339 to S342 in parallel with Step S338.

In Step S339, processor 150 counts the consecutive accurate operation number. Specifically, processor 150 determines whether the class indicated by evaluation data 161 generated in Step S337 is Great or above, and in a case in which it is Great or above, updates consecutive accurate operation number data 163 so that the value indicated thereby increments by 1. In a case in which the class is below Great, the processor updates consecutive accurate operation number data 1630 so that the value indicates 0. Thus, processor 150 serves as a consecutive accurate operation number counter for counting the continuing number of accurate operations, by a player, classified as belonging to one of the accurate operation classes.

Processor 150 then determines whether the consecutive accurate operation number indicated by the updated consecutive accurate operation number data 163 is 0 (S340). In a case in which a result of this determination is NO, processor 150 performs a lowest class accurate operation update process for updating lowest class accurate operation data 168 (S341). In the lowest class accurate operation update process, processor 150 overwrites, from among pieces of evaluation data 161 for the consecutive accurate operation number, a piece of evaluation data 161 that shows the lowest class into volatile area R1 as lowest class accurate operation data 168. That is, processor 150 identifies, as lowest class accurate operation data 168, data indicating the lowest class from among currently continuing accurate operations. Thus, processor 150 serves as a lowest class accurate operation identifier for identifying the lowest accurate operation class by a player from among accurate operation classes corresponding to plural accurate operations counted by the consecutive accurate operation number counter.

Processor 150 then starts a consecutive accurate operation number display process for displaying the consecutive accurate operation number (S342). In the consecutive accurate operation number display process, processor 150, as shown in FIG. 10, causes display device 120 to display the consecutive accurate operation number counted in Step S339 in a color corresponding to the class indicated by lowest class accurate operation data 168 in accordance with correspondence relationships described in class-color relationship data 170 ("23" in FIG. 10). That is, the consecutive accurate operation number is displayed in white if the class indicated by lowest class accurate operation data 168 is Marvelous, in yellow if the class is Perfect, and in green if the class is Great. Thus, processor 150 serves as an accurate operation number display instructor for causing display device 120 to display the number counted by the consecutive accurate operation number counter in a color corresponding to the lowest accurate operation class identified by the lowest class accurate operation identifier.

On the other hand, in a case in which a result of the determination in Step S340 is YES, the process of Steps S341 and S342 are skipped. When the processes from Steps S338 to S342 end, the process returns to Step S331. Therefore, in a case in which a player consecutively performs operations of Great or the above class, the consecutive accurate operation number displayed on display surface 121 will increase. In a case in which another mode is selected, the operation will be different from what was described in the foregoing, but the differences should be clear from the above descriptions.

A method for generating the image data (for example, bit map image data) for displaying the consecutive accurate operation number can be freely selected. According to the present embodiment, white image data, yellow image data, and green image data for each of the numbers 0 to 9 are stored in advance in non-volatile area R2, and for each digit of the consecutive accurate operation number, image data corresponding to the value of the digit and to a class indicated by the lowest class accurate operation data is identified, and the identified pieces of image data are combined to generate the image data of the consecutive accurate operation number. Therefore, there is an advantage in that less memory capacity is required in comparison with a case in which image data for each color is prepared for every possible value of the consecutive accurate operation number.

As is clear from the above description, game device 100 has at least one operation device operated by a player, an operation instructor for instructing the player to perform consecutive individual standard operations, an evaluator for classifying the degree of accuracy of each operation by the player as one of plural classes based on a difference between a time at which each of the standard operations should be performed and a time at which the operation device was operated, the plural classes including plural accurate operation classes and at least one inaccurate operation class; a consecutive accurate operation number counter for counting the consecutive number of accurate operations, by the player, classified by the evaluator as belonging to one of the accurate operation classes, a lowest class accurate operation identifier for identifying, from among accurate operation classes corresponding to plural accurate operations counted by the consecutive accurate operation number counter, the lowest accurate operation class by the player, and an accurate operation number display instructor for causing a display device to display the number counted by the consecutive accurate operation number counter in a color corresponding to the lowest accurate operation class identified by the lowest class accurate operation identifier.

According to game device 100, in a computer game (the specific dance game) in which it is determined whether the player's individual movements agree with a standard movement sequence prepared in advance, the number of continuing accurate operations of a particular class (Great) or above is displayed in a color corresponding to the lowest accurate operation class (Marvelous, Perfect, or Great) from among the counted accurate operations. Therefore, it is possible to display whether a play is good or bad in sufficient detail in an easy-to-understand manner. Therefore, a person who knows correspondence relationships between the classes for the degree of accuracy of operations and colors displayed on the display device can know not only the consecutive accurate operation number displayed on the display device, but also the lowest accuracy class from among continuing accurate operations, by color. More specifically, according to game device 100, simply by looking at the color of the displayed consecutive accurate operation number, it is possible to know whether the consecutive accurate operation number is the number of a series of operations including only Marvelous, the number of a series of operations including an operation under Perfect, but not including an operation under Great, or the number of a series of operations including an operation under Great.

Furthermore, according to game device 100, an evaluation message corresponding to a class indicated by evaluation data is displayed in a color corresponding to this class in accordance with correspondence relationships described in class-color relationship data 170, and the consecutive accurate operation number is displayed in a color corresponding to the lowest accuracy class from among accurate operations for which the consecutive accurate operation number is counted, in accordance with the correspondence relationships described in the same class-color relationship data 170. Therefore, a person who looks at screen 121 can easily identify the accurate operation class (Marvelous, Perfect, or Great) of the consecutive accurate operation number based on the colors of both the evaluation message and the consecutive accurate operation number. Therefore, in a case in which the color of the consecutive accurate operation number is the same as the color of the evaluation message, the lowest accurate operation class is the same as the class indicated by the displayed evaluation message. In a case in which the color of the consecutive accurate operation number is different from the color of the evaluation message, the lowest accurate operation class is different from a class indicated by the displayed evaluation message. Therefore, even a person who is not familiar with the correspondence relationships between the classes for the degree of accuracy of operation and the colors displayed on the display device can infer the lowest accuracy class of the continuing accurate operations.

Modifications

In the above embodiment, the game device according to the present invention is implemented as a commercial-use game machine, but it can be a home use game machine In a case in which it is implemented as a home use game machine, the game device and the display device 120 will normally be different entities. Furthermore, the number of operation devices for which a mark instructing an operation may be 1, or an operation device and a mark instructing an operation may correspond one-to-one with each other.

Furthermore, in the above embodiment, the inaccurate operation classes are three classes, Good, Almost, and Boo, but may be at least one inaccurate operation class. In the above embodiment, the accurate operation classes are three classes, Marvelous, Perfect, and Great, but may be at least two accurate operation classes. Therefore, the total number of classes for the degree of accuracy of operations including the inaccurate operation class and the accurate operation class may be three or greater. Furthermore, in another embodiment, only the consecutive accurate operation number may be displayed without the evaluation message. Furthermore, a computer game to be applied to is not limited to a dance game.

Furthermore, in the above embodiment, the whole character representing the consecutive accurate operation number is displayed in a color corresponding to the lowest class for the consecutive accurate operation number, but this may be modified so that a part of the character representing the consecutive accurate operation number is displayed in a color corresponding to the lowest class for the consecutive accurate operation number. Examples of a part of the consecutive accurate operation number include a part or the entire outline of the character or a part or all of a portion excluding the outline of the character.

Furthermore, in the above embodiment, every time the consecutive accurate operation number data 163 is updated, the consecutive accurate operation number on display surface 121 is updated. However, this may be modified so that the consecutive accurate operation number on display surface 121 is updated only when the consecutive accurate operation number indicated by the consecutive accurate operation number data 163 is a predetermined value. Furthermore, computer program 166 may be downloadable via a network. A non-rewritable area R21 may be provided on a removable medium such as a CD-ROM.

Also, according to the above-described embodiment, processor 150, which is an operation instructor for instructing a player to perform a standard operation, uses display device 120 to instruct a player to perform a standard operation. Instead, a player may be instructed to perform the standard operation visually, aurally, tactually, or by a combination thereof.

In the foregoing, a specific embodiment of the present invention was described, but the present invention can also be implemented as a computer program 166 including a sequence of machine-readable instructions describing the method of the above-disclosed game device or as a computer program product carrying (bearing) the computer program. The "computer program products" include a computer-readable information recording medium having recorded thereon the computer program, or a transmission medium (data carrier) for transmitting the computer program. The "information recording media" include, in addition to the above embodiments, various types of disks, tapes, chips, or sticks. A "transmission medium" can be one of various types of networks regardless of whether it is wireless or wired. A type of computer program can be compiled or not compiled.

What is claimed is:
1. A game device comprising:
at least one operation device operated by a player;
an operation instructor for instructing the player to perform consecutive individual standard operations;
an evaluator for classifying a degree of accuracy of each operation by the player as one of plural classes based on a time difference between a time at which each of the standard operations should be performed and a time at which the operation device was operated, the plural classes including plural accurate operation classes and at least one inaccurate operation class;

a consecutive accurate operation number counter for counting a consecutive number of accurate operations, by the player, classified by the evaluator as belonging to one of the accurate operation classes;

a lowest class accurate operation identifier for identifying, from among accurate operation classes corresponding to plural accurate operations counted by the consecutive accurate operation number counter, a lowest accurate operation class by the player; and an accurate operation number display instructor for causing a display device to display the number counted by the consecutive accurate operation number counter in a color corresponding to the lowest accurate operation class identified by the lowest class accurate operation identifier.

2. The game device according to claim 1, further comprising:

a storage device having stored therein correspondence relationships between classes for the degree of accuracy to be classified by the evaluator and colors to be displayed on the display device; and an evaluation message display instructor for causing the display device to display an evaluation message indicating a class classified by the evaluator every time the evaluator classifies the degree of accuracy for each operation as one of the plural classes, wherein the evaluation message display instructor causes the display device to display the evaluation message in a color corresponding to the class classified by the evaluator in accordance with the correspondence relationships stored in the storage device, and wherein the accurate operation number display instructor causes the display device to display the number counted by the consecutive accurate operation number counter in a color corresponding to the lowest accurate operation class in accordance with the correspondence relationships stored in the storage device.

3. A computer-readable recording medium having stored thereon a computer program for causing a computer having at least one operation device operated by a player to function as:

an operation instructor for instructing the player to perform consecutive individual standard operations;

an evaluator for classifying a degree of accuracy of each operation by the player as one of plural classes based on a time difference between a time at which each of the standard operations should be performed and a time at which the operation device was operated, the plural classes including plural accurate operation classes and at least one inaccurate operation class;

a consecutive accurate operation number counter for counting a consecutive number of accurate operations, by the player, classified by the evaluator as belonging to one of the accurate operation classes;

a lowest class accurate operation identifier for identifying, from among accurate operation classes corresponding to plural accurate operations counted by the consecutive accurate operation number counter, a lowest accurate operation class by the player; and an accurate operation number display instructor for causing a display device to display the number counted by the consecutive accurate operation number counter in a color corresponding to the lowest accurate operation class identified by the lowest class accurate operation identifier.

4. A method in a game device having an operation device, comprising:

instructing a player to perform consecutive individual standard operations;

classifying a degree of accuracy of each operation by the player as one of plural classes based on a time difference between a time at which each of the standard operations should be performed and a time at which the operation device was operated, the plural classes including plural accurate operation classes and at least one inaccurate operation class;

counting, by a processor, a consecutive number of accurate operations performed by the player, as classified by the evaluator as belonging to one of the accurate operation classes;

identifying, from among accurate operation classes corresponding to plural accurate operations counted by the processor, a lowest accurate operation class by the player; and causing a display device to display the number counted by the processor in a color corresponding to the lowest accurate operation class identified.

5. The device according to claim 1, wherein the consecutive accurate operation number counter only counts the consecutive number of accurate operations when the classified class is equal to or greater than a predetermined class.

6. The computer readable recording medium of claim 3, wherein the consecutive accurate operation number counter only counts the consecutive number of accurate operations when the classified class is equal to or greater than a predetermined class.

7. The method of claim 4, wherein the counter only counts the consecutive number of accurate operations when the classified class is equal to or greater than a predetermined class.

* * * * *